US009904932B2

(12) United States Patent
Fabrikant et al.

(10) Patent No.: US 9,904,932 B2
(45) Date of Patent: Feb. 27, 2018

(54) ANALYZING SEMANTIC PLACES AND RELATED DATA FROM A PLURALITY OF LOCATION DATA REPORTS

(71) Applicant: Google Inc., Mountain View, CA (US)

(72) Inventors: Alexander Fabrikant, Menlo Park, CA (US); Amirali Abdullah, Salt Lake City, UT (US); Erik Nathan Vee, San Mateo, CA (US)

(73) Assignee: Google LLC, Mountain View, CA (US)

( * ) Notice: Subject to any disclaimer, the term of this patent is extended or adjusted under 35 U.S.C. 154(b) by 518 days.

(21) Appl. No.: 14/595,256

(22) Filed: Jan. 13, 2015

(65) Prior Publication Data
US 2016/0189186 A1   Jun. 30, 2016

Related U.S. Application Data

(60) Provisional application No. 62/097,423, filed on Dec. 29, 2014.

(51) Int. Cl.
G06Q 10/00 (2012.01)
G06Q 30/02 (2012.01)
G06F 17/30 (2006.01)
H04W 4/02 (2018.01)
H04W 4/00 (2018.01)

(52) U.S. Cl.
CPC ... *G06Q 30/0205* (2013.01); *G06F 17/30241* (2013.01); *H04W 4/025* (2013.01); *H04W 4/028* (2013.01); *H04W 4/008* (2013.01); *H04W 4/026* (2013.01); *H04W 4/027* (2013.01)

(58) Field of Classification Search
CPC ......... G06Q 10/00; G06Q 40/00; G06F 17/60
USPC ....................................... 705/7.11
See application file for complete search history.

(56) References Cited

U.S. PATENT DOCUMENTS 8,639,640 B1   1/2014  Kadous
8,886,649 B2  11/2014  Zhang et al.
9,204,254 B2 * 12/2015  Hawkins ............. G06F 17/3087
(Continued)

FOREIGN PATENT DOCUMENTS

EP    1 939 797 A1    7/2008

OTHER PUBLICATIONS

PCT International Search Report for corresponding PCT Application No. PCT/US2015/053741, dated Dec. 22, 2015, pp. 4.
(Continued)

*Primary Examiner* — Romain Jeanty
(74) *Attorney, Agent, or Firm* — Dority & Manning, P.A.

(57) ABSTRACT

Computer-implemented methods and systems of determining semantic place data include receiving a plurality of location data reports from a plurality of mobile devices, partitioning them into localized segments, and estimating a geographic region bucket for each segment. For clustering canopies of localized segments identified as satisfying a potential geographic overlap characterization, an overlap score is calculated that correlates the overlap among actual geographic regions covered by movement of the mobile devices generating the localized segments in that given clustering canopy. A data structure that provides a hierarchical clustering configuration of the localized segments in each geographic region bucket is generated from the determined overlap scores. Additional semantic data for nodes in the data structure can also be provided.

23 Claims, 10 Drawing Sheets

(56) References Cited

U.S. PATENT DOCUMENTS

| | | | | |
|---|---|---|---|---|
| 9,521,524 | B2* | 12/2016 | Busch | H04W 4/02 |
| 2006/0085177 | A1* | 4/2006 | Toyama | G01C 21/26 |
| | | | | 703/22 |
| 2012/0246000 | A1* | 9/2012 | Yarvis | H04L 67/18 |
| | | | | 705/14.53 |
| 2013/0317944 | A1* | 11/2013 | Huang | G01S 5/0252 |
| | | | | 705/26.61 |
| 2014/0082062 | A1* | 3/2014 | Bellver | G06F 17/3087 |
| | | | | 709/203 |
| 2014/0129560 | A1 | 5/2014 | Grokop et al. | |
| 2014/0236882 | A1 | 8/2014 | Rishe | |
| 2015/0147997 | A1* | 5/2015 | Shaw | G06F 21/554 |
| | | | | 455/404.2 |

OTHER PUBLICATIONS

McCallum et al, "Efficient Clustering of High-Dimensional Data Sets with Application to Reference Matching", International Conference on Knowledge Discovery and Data Mining; Aug. 20, 2000, Boston, MA, pp. 169-178.

Shi et al, "Segmentation of Mobile User Groups Based on Traffic Usage and Mobility Patterns", 2014 IEEE 17th International Conference on Computational Science and Engineering, Dec. 19, 2014, Chengdu, P.R. China, pp. 224-230.

Hightower et al, "Learning and Recognizing the Places We Go", Aug. 19, 2005 (Aug. 19, 2005), UBICOMP 2005: Ubiquitous Computing; [Lecture Notes in Computer Science; LNCS], Springer-Verlag, Berlin/Heidelberg, pp. 159-176, XP019015081, ISBN: 978-3-540-28760-5.

Canopy Clustering Algorithm, In Wikipedia. Retrieved Jan. 12, 2015, from http://en.wikipedia.org/wiki/Canopy_clustering_algorithm, 2 pages.

Conte et al., "Thirty Years of Graph Matching in Pattern Recognition", International Journal of Pattern Recognition and Artificial Intelligence, vol. 18, No. 3, (2004), pp, 265-298.

Kim et al., "SensLoc: Sensing Everyday Places and Paths Using Less Energy", ACM Conference on Embedded Networked Sensor Systems, Nov. 3-5, 2010, Zurich, Switzerland, 14 pages.

* cited by examiner

ANALYZING SEMANTIC PLACES AND RELATED DATA FROM A PLURALITY OF LOCATION DATA REPORTS

PRIORITY CLAIM

The present application claims the benefit of priority of U.S. Provisional Patent Application No. 62/097,423, entitled Determining Semantic Place Boundaries and Related Data from a Plurality of Location Reports, filed Dec. 29, 2014, which is incorporated herein by reference for all purposes.

FIELD

The present disclosure relates generally to determining semantic place data associated with various signals pertaining to a device's geographic location, and more particularly to analyzing semantic places and related data from a plurality of location data reports.

BACKGROUND

Mobile devices including smart technology features can be employed when authorized to identify the location of mobile device users. Given the desire to respect user privacy, mobile device location is typically only determined if a user provides consent therefor. Any authorized sharing of user location data is secure and private, and shared only if additional consent is provided. For many purposes, user identity associated with the location of a mobile device is configured in an anonymous manner such that user assistance and information related to a specific location is provided without a need for user-specific information.

When using a mobile device to determine a user's location, some known systems first use location sensors from a mobile device, such as global positioning system (GPS) outputs, wireless scan outputs, and accelerometer outputs, to obtain a best known estimate of a user's physical location (e.g., specific geographical coordinates.) These geographical coordinates can then be compared to a database of known places (e.g., local businesses) to infer the most likely semantic location of the user (e.g., the name of the venue, home or business). Accuracy of these techniques is often limited by the quality and accuracy of location sensors as well as the availability and quality of semantic place metadata.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining semantic place data. The method can include examining, by one or more computing devices, a plurality of time series of historical location data reports to determine their level of overlap. The method can further include grouping, by the one or more computing devices, selected time series of historical location data reports that are determined to be sufficiently overlapping. The method can further include assigning, by the one or more computing devices, location classifiers distinguishing one or more location entities based on the grouping of selected time series of historical location data reports that are determined to be sufficiently overlapping. The method can still further include determining, by the one or more computing devices, semantic location data for one or more time series of current or historical location data reports using the assigned location classifiers.

Another example aspect of the present disclosure is directed to a computer-implemented method of determining semantic place data. The method can include receiving, by one or more computing devices, a plurality of location data reports from a plurality of mobile devices. The method can further include partitioning, by the one or more computing devices, the plurality of location data reports into localized segments of location data reports. The method can still further include estimating, by the one or more computing devices, a geographic region bucket for each localized segment. The method can still further include identifying, by the one or more computing devices, within each geographic region bucket, one or more clustering canopies, which are groups of localized segments that satisfy a potential geographic overlap characterization. The method can still further include determining, by the one or more computing devices, an overlap score for each pair of localized segments that share at least one clustering canopy in common. The overlap score can correlate with the overlap among the actual geographic areas covered by movement of the mobile devices generating the localized segments in that given pair. The method can still further include generating, by the one or more computing devices, a data structure that provides a clustering configuration of the localized segments in each geographic region bucket. The data structure can be generated at least in part from the determined overlap scores. The method can still further include determining, by the one or more computing devices, semantic place data for one or more localized segments based at least in part on the clustering configuration of the generated data structure.

Other example aspects of the present disclosure are directed to systems, apparatus, tangible, non-transitory computer-readable media, user interfaces, memory devices, and electronic devices for determining semantic location boundaries and other related data.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
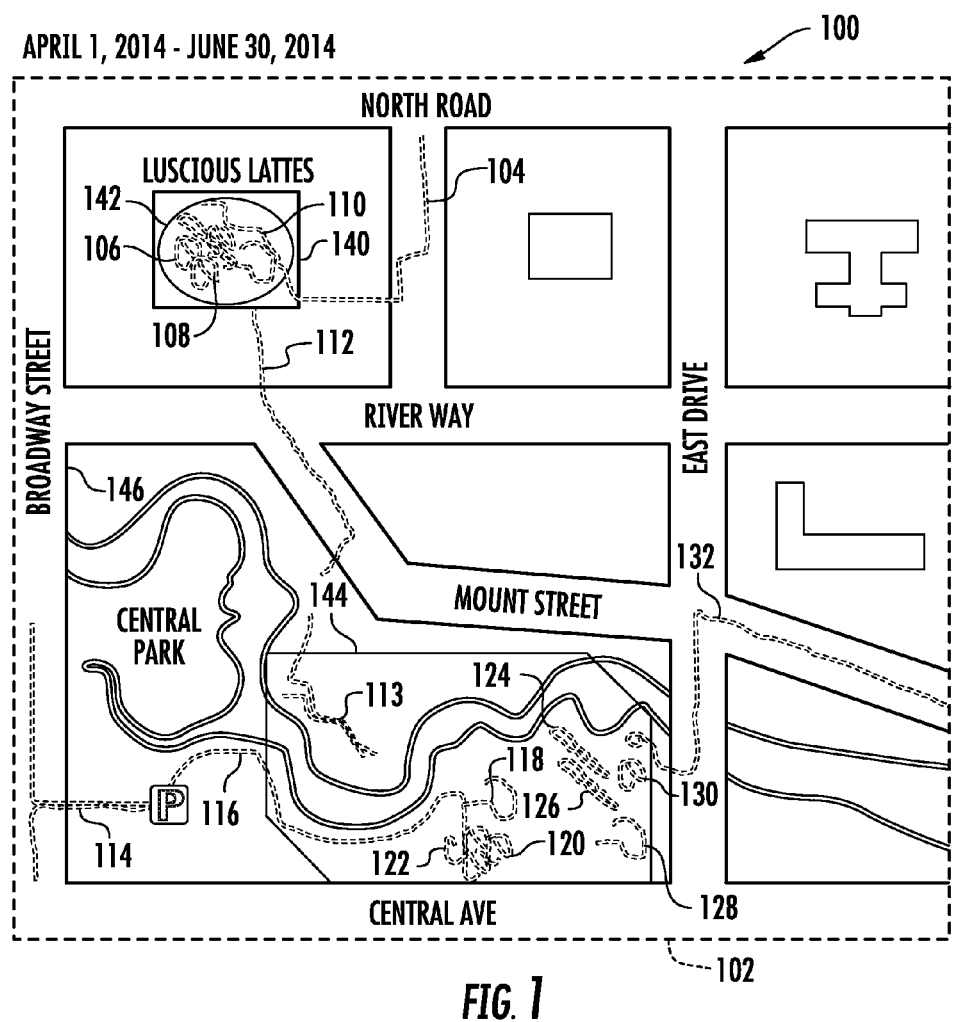
FIG. 1 depicts a geographic model of example aspects of semantic place data determined from a plurality of location sensor time series according to example aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods for analyzing semantic places and related data from location data reports. The accuracy of known approaches for associating semantic place information with mobile device location signals can be limited. In some instances, limitations arise based on quality or resource consumption of location sensors. For example, mobile device constraints related to the battery, antenna size, and architecture of mobile hardware and operating systems make it difficult to reliably compute a user's physical location with high enough precision to pinpoint a semantic place under many circumstances. Accuracy of this approach also can be limited by the availability and quality of semantic place metadata. For example, even with extraordinarily precise and consistent determinations of the physical location of a user, a semantic place identification system would need a complete, detailed, consistently current dataset about the exact boundaries of semantic places everywhere in the physical world. This type of comprehensive database can be difficult to establish and consistently maintain.

The disclosed embodiments according to aspects of the present disclosure can provide location-aware technology features that generate useful and more accurate semantic location data associated with a user's location (e.g., the name of the venue where the user is located; a coherent subset of a single venue or a set of multiple venues often traversed by a person in a single visit; whether the user is in a space populated by a diverse and shifting population of people or a private space shared with a small fixed set of people). More accurate semantic place data, including semantic place models and/or semantic place classifier model responses to query data, can lead to improved generation of semantic place metadata and more accurate predictions of a user's semantic place location based on new location data report information. By providing more robust systems and methods of determining this location-based information and by improving the accuracy of such information, corresponding improvements can be made to location-based technologies such as contextually-influenced services, advertisement targeting, and advertisement effectiveness tracking. These improvements can be useful to a variety of technology entities, including mobile platform designers and manufacturers, creators of location-aware mobile applications and telecommunications providers.

Example embodiments can include computer-implemented systems and methods of determining semantic place data, including clustering techniques that are employed as part of the automatic and dynamic learning of semantic place associations. Example inputs to this computer-implemented technology can be provided in the form of a large corpus of location data reports, for example, location sensor report time series, from a large number of different mobile devices. This location data report information can optionally include a variety of specific data, including but not limited to: user and/or mobile device identifiers (IDs); time stamps; raw location sensor readings, which typically allow the estimation of a distance to zero or more "beacons" whose approximate location is known; physical location estimates; and/or physical location error models. Beacons may include Wi-Fi access points, GPS satellites, cell towers, and/or bluetooth transmitters. In examples where the location data reports correspond to a large collection of Wi-Fi scans, the raw location sensor readings can include identifiers and/or Wi-Fi signal strength readings and/or access point frequency and channel data for the access points observed by the device. Physical location estimates can come from GPS, cell tower triangulation, Wi-Fi based geolocation, accelerometer or gyroscope-based dead reckoning, barometer readings, and/or other location-based input data.

In some embodiments, in order to obtain the benefits of the techniques described herein, the user may be required to allow the collection and analysis of location information associated with a user or device. For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. For example, embodiments of the disclosed technology can be configured to enhance user privacy by removing identifiers for mobile devices or users. In some instances, device and/or user identifiers can be replaced with a lossy device indicator which might conflate a large number of devices or users into a single identifier.

From the collection of location data reports received from different mobile devices, localized segments of location data reports can be created by partitioning the location data reports into different time series segments during which a mobile device stayed within a given localized area. Localized segments then can be characterized as belonging to one or more geographic region buckets. These geographic region buckets can correspond to spheres, rectangles or other polygons that partition the Earth's surface in a meaningful distributed manner. For example, the geographic confines of a city may be categorized into a rectangular grid of geographic region buckets. Each localized segment is then estimated as belonging to one or more of these geographic region buckets. In some examples, this estimation involves determining the median estimated physical location of a user within the time slot of each localized segment and rounding that median location to one or more of the predetermined geographic region buckets. In some instances, a given localized segment for a user or mobile device can be estimated as belonging to more than one geographic region bucket.

Once all localized segments are estimated into respective geographic region buckets, various processing features are implemented for each region bucket. Initially, in each geographic region bucket, one or more clustering canopies can be identified, where a clustering canopy constitutes a group of localized segments in the given region bucket that satisfy a potential geographic overlap characterization. In one example, a clustering canopy is defined for a distinct single beacon identifier, such as a Wi-Fi access point BSSID, observed in the geographic region bucket. In some implementations, such a clustering canopy will contain all localized segments containing at least a threshold number or fraction of location data reports indicating that the given beacon identifier was observed, or observed above a threshold signal strength or within a certain distance estimate.

In a given geographic region bucket, pairs of localized segments that share at least one clustering canopy are then eligible for overlap scoring. Overlap scores correlate with the overlap among the actual geographic region covered by movement of the mobile devices generating the localized segments in that given pair or grouping of localized segments. The region covered by the movement of a mobile device can be defined as one of or a combination of the following regions: the convex hull of the device's locations, the convex hull of the device's locations with outlier locations withheld, the sum of kernel functions at the device's location. The resulting set of overlap scores for the eligible pairs of localized segments is then used to generate a data structure that provides a hierarchical clustering of the localized segments in each geographic region bucket. In some examples, the generated data structure is a forest data structure whose leaves correspond to the localized segments. In some examples, one or more processing algorithms such as a canopy hierarchical agglomerative clustering (HAC) algorithm is employed to generate the data structure. In some examples, the HAC algorithm uses a linkage merging heuristic. In some examples, the linkage merging heuristic used is average linkage merging.

Once the clustering techniques are used to associate various localized segments together in a data structure, additional aspects of the disclosed technology concern a corresponding determination of semantic place data to selected correlated segments. In the generated data structure, various types of semantic place data for one or more localized segments in each geographic region bucket can be associated with one or more nodes in the hierarchical clustering configuration. In one example, one or more localized segments that are associated with semantic place data can be used to associate other nodes in the data structure with the semantic place data of one or more given segments based in at least in part on the data structure. In some examples, the semantic place data can be the identifier of a venue. In other examples, the semantic place data can be one or more identifiers of possible venues, paired with estimated likelihoods or scores. In still further examples, the semantic place data can include user demographic data associated with a semantic place, popularity levels of places, users or other entities related to associated location entities, predictive user information related to associated location entities or other useful information related to the associated location entities.

In some examples, responsive to a query containing a location data report, a group of one or more location data reports, or a localized segment from a given device, the data structure and its associated semantic place labels can be used to generate a prediction of the semantic place data for the given device at the time that it collected the query data. In one example, the query may contain the querying device's current location data report. In another example, the query may contain two or more most recently recorded location data reports or the current localized segment. In a further example, the query may contain a plurality of location reports or a localized segment recorded by the device in the past.

In other examples, geographic models can be created using one or more edges or graph cuts of maximum size or sparsity in the forest data structure to define semantic place boundaries in terms of the statistical properties of the location data reports appearing on the two sides of the edge or graph cut. In some examples, the estimated physical locations of the groups of reports separated by the edge or graph cut can be used to generate estimated sensed geographical boundaries for various semantic place locations.

Still further applications of the present disclosure may use the localized segment clustering results for different purposes.

According to an example embodiment, mobile device users provide historical or current information about their location, including one or more location data reports with one or more of: a time-stamp, an estimated physical location, and a semantic place label. These location data reports as well as optional information regarding semantic place metadata corresponding to nearby locations from the users' location data reports are used in conjunction with the disclosed semantic place boundary detection techniques to generate clustering data structures and related models that provide increased accuracy of semantic location associations in various geographic areas. The resulting data structures and related models can then be used for future location-based applications. For example, the next time a mobile device user generates a location data report having particular coordinates, a predicted semantic place location associated with those coordinates or other related semantic location data can be presented to the user with higher confidence or can be used to generate related location-based information having an increased level of appropriate context.

Some aspects of the disclosed technology refer to the estimation, determination, and generation of location information that can be helpful in mapping or other location based technologies. For this reason, FIG. 1 and other figures herein show aspects of the disclosed technology relative to map interfaces. It should be appreciated that the disclosed embodiments are not limited to mapping applications, and may be extended to such applications as contextually-influenced services, advertisement targeting and effectiveness tracking, and others.

Referring more particularly to FIG. 1, an exemplary geographic model 100 includes a cut-out section of an electronically-generated graphical map interface 102. The graphical map interface 102 of FIG. 1 and other figures herein may illustrate just a portion of the entirety of a global map interface accessible by embodiments of the disclosed technology. Graphical map interface 102 can provide a graphical depiction of the approximate physical locations contained in, or inferred from, the plurality of user locations received from a plurality of mobile devices within a selected time period. For example, one or more routes (e.g., routes 104-132, respectively) correspond to the geographic locations traversed by a plurality of mobile device users during a selected time period (e.g., Apr. 1, 2014-Jun. 30, 2014) The routes 104-132 taken by the plurality of users can be overlaid upon a map showing the corresponding geographical area traversed by the users. Some users traversed greater distances during the selected time period, for example, users associated with routes 104, 112, 114 and 132. Other users were more stationary or traversed shorter distances during the selected time period.

In other examples, geographic map interface 102 could illustrate approximate physical locations contained in, or inferred from, location data reports in the form of dots or other icons representative of periodically obtained specific snapshots of user locations in time, as opposed to interpolating between the received location data reports using the continuous time location track shown by routes 104-132, respectively. For example, instead of showing a continuous route for each mobile device user location, a single icon or marker could be illustrated to show user location in intervals, for example, every predetermined number of seconds or minutes. Despite the different ways of illustrating location data reports on a map, location data reports generally can provide time and information about the device's location. For example, the location included in each location data report can include an estimate of the device's coordinates (e.g. latitude, longitude, and/or altitude), an estimate of or model of the error in the device's coordinates, raw signals indicating the identity of and estimated distance to one or more beacon devices (such as a Wi-Fi access point, GPS satellite, cell tower, or bluetooth transmitter), IP address information, geocodes, or other information identifying or associated with a particular location.

Referring still to FIG. 1, analysis conducted in accordance with disclosed embodiments facilitates a grouping of location data reports into localized segments. As will be described later in more detail, clustering algorithms can be used to generate a data structure for each geographic region bucket that is based on the localized segments and can be used to create classifiers for meaningful boundaries or groupings between semantic places. One example embodiment uses the data structure produced by a clustering algorithm from one or more input localized segments, and semantic place data for one or more of the input localized segments to approximately separate input localized segments into those received from devices visiting a given semantic place and those received from devices not visiting it. This classification, together with estimated physical locations of the localized segments' location data reports, can be used to generate predicted boundaries for a semantic place.

For example, considering the cluster of routes 106, 108 and 110 in FIG. 1, if one or more of them is known to have been received from a coffee shop called "Luscious Lattes", the clustering data structure created by the disclosed embodiments may allow us to label all such routes as being received from Luscious Lattes, and all other routes as not being received from Luscious Lattes. The exact boundaries of the coffee shop 140 may not be known. However, the disclosed embodiments can generate both a geographic boundary estimate 142 for Luscious Lattes and a classifier that, responsive to a new location data report or localized segment, produces the probability that it was received from Luscious Lattes. Over time and with consideration of an increasingly greater number of location data reports, the boundary estimate 142 could be expected to increase with accuracy and coverage such that the boundary estimate 142 ultimately approaches the same area as encompassed by the actual boundaries 140 of the physical space traversed by visitors to Luscious Lattes.

Another example in FIG. 1 is shown relative to an outdoor landmark, Central Park having an actual boundary 146. Analysis in accordance with the disclosed techniques relative to routes 113, 116, 118, 120, 122, 124, 126, 128 and 130 could generate an example boundary estimate 144, which may be used as an approximation for the boundary of Central Park. In another example, the generated boundary estimate 144, or the corresponding classifier model for new location data reports or localized segments, can be considered independently to define a semantic space frequently traversed by users in a single visit. For instance, this may correspond to the publicly-accessible subset of the park, or to a particular popular area, or to a subset of the park best suited for users matching one or more demographic or psychographic characteristics, such as a dog park. The disclosed embodiments can then be used with the model corresponding to the boundary estimate 144 to establish, responsive to one or more location data reports or a localized segments received from a given user, whether the given user is, in fact, a dog owner.

Generation of boundary estimates as shown in the example of FIG. 1 and discussed relative to some disclosed embodiments can be helpful for a variety of reasons. Even when a general address or geographical coordinates for a given semantic place (e.g., Luscious Lattes) is known, the confines of a building exterior, building interior, or a subset of the building interior that houses the business, residence, landmark, or other location may not be known. Even if the contour of the venue is known, the interior boundaries within which users may be operating their mobile devices can vary significantly from the venue exterior or interior confines. For outdoor locations, such as Central Park shown in FIG. 1, the surveyed boundaries 146 defining a property area may be quite different than the actual navigable area within which a user typically operates a mobile device. This could be due to blocked off areas, un-navigable terrain due to water features, rock croppings, fences, or other natural or man-made obstructions.

Semantic boundaries inferred by the disclosed embodiments may also not correspond to well-defined POI boundaries but rather to user behavior patterns, such as the separation between a dog park and a playground, or between two departments of a large store. A geometric boundary estimate and/or a raw signal classifier characterizing a semantic place boundary of a space frequently traversed by users of mobile devices is beneficial in making future predictions about the semantic location associated with a current, future, or past location data reports and/or localized segments, and for drawing other semantic inferences about the reporting device user's behavior or demographic or psychographic characteristics.

Figure 2:
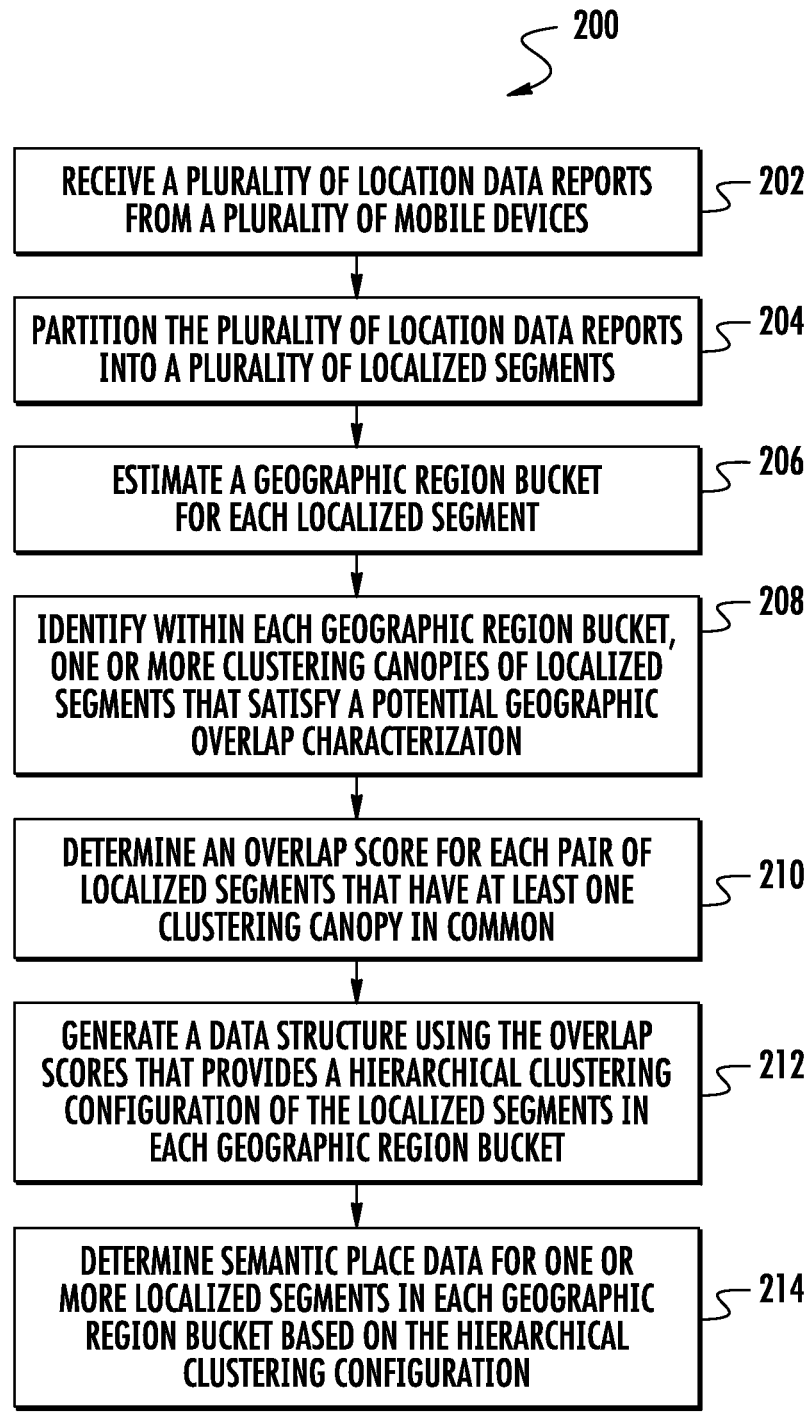
FIG. 2 provides a flow diagram of an example method of determining semantic place data according to example aspects of the present disclosure.

FIG. 2 provides a flow diagram of an example method 200 of determining semantic place data according to aspects of the present disclosure. A plurality of location data reports is received (202) from a plurality of mobile devices. In some examples, more comprehensive analysis can be conducted by analyzing a greater number of location data reports from a larger collection of mobile devices (e.g., by collecting location data reports over a greater span of time). Location data reports generally can correspond to data that provides information relevant for establishing the location of a mobile device user at a fixed time and location of a mobile device user. Specific location data reports can include one or more of: a mobile device identifier; a user identifier; a time stamp; an estimated physical location; a model of the likely error in the physical location; one or more raw location sensor readings, indicating, for each of one or more beacon devices (such as a Wi-Fi access point, GPS satellite, cell tower, or bluetooth transmitter), the identity of the beacon and a metric allowing the estimation of distance between the beacon and the mobile device; other raw sensor readings (such as accelerometer, gyroscope, barometer, magnetometer); information about the device's semantic location if known; and/or a measure of confidence in the semantic location.

In some examples, the beacons used are Wi-Fi access points, with Wi-Fi Received Signal Strength Indicator (RSSI) used to estimate distance to the access points. The location data reports can then be obtained as a large collection of Wi-Fi scan time series collected from a geographic region bucket. For instance, each entry in such a collection of time series reports can include one or more access point identifiers for wireless access points that are visible to each mobile device. Specific identifiers can include a Wi-Fi access point Basic Service Set Identifier (BSSID), which corresponds to the Media Access Control (MAC) address for that wireless access point. For each reported BSSID, the report can also include a corresponding signal strength reading, e.g., a Received Signal Strength Indicator (RSSI) value, a timestamp, and optionally an identifier of the device or user from which the report was generated.

Referring again to FIG. 2, the plurality of received location data reports are then partitioned (204) into a plurality of localized segments. Each localized segment generally can correspond to a time series during which a particular mobile device stayed roughly stationary. In some examples, a starting time and ending time can be associated with each localized segment. For example, the starting time for each localized segment can be the earliest time associated with any location data report included in such segment. Likewise, the ending time for each localized segment can be the latest time associated with any location data report included in such segment. In some examples, if the ending time of a segment minus the starting time of the segment is not greater than a threshold value (e.g. ten minutes), then such segment can be discarded or otherwise ignored. In some examples, segments can be bounded by times when the user's location sensor readings indicate that the user is traveling significantly faster than walking, so that, for instance, location data reports from when a user is driving delimit localized segments and are themselves not analyzed as part of the disclosed systems and methods for determining semantic place data. In some examples, a segment can be bounded by times when a user leaves an area and does not return for a certain amount of time. In some examples, a segment can be bounded by times when a user's device is not observing any signal of a certain BSSID or other wireless access point for a certain number of consecutive Wi-Fi scans.

Figure 3:
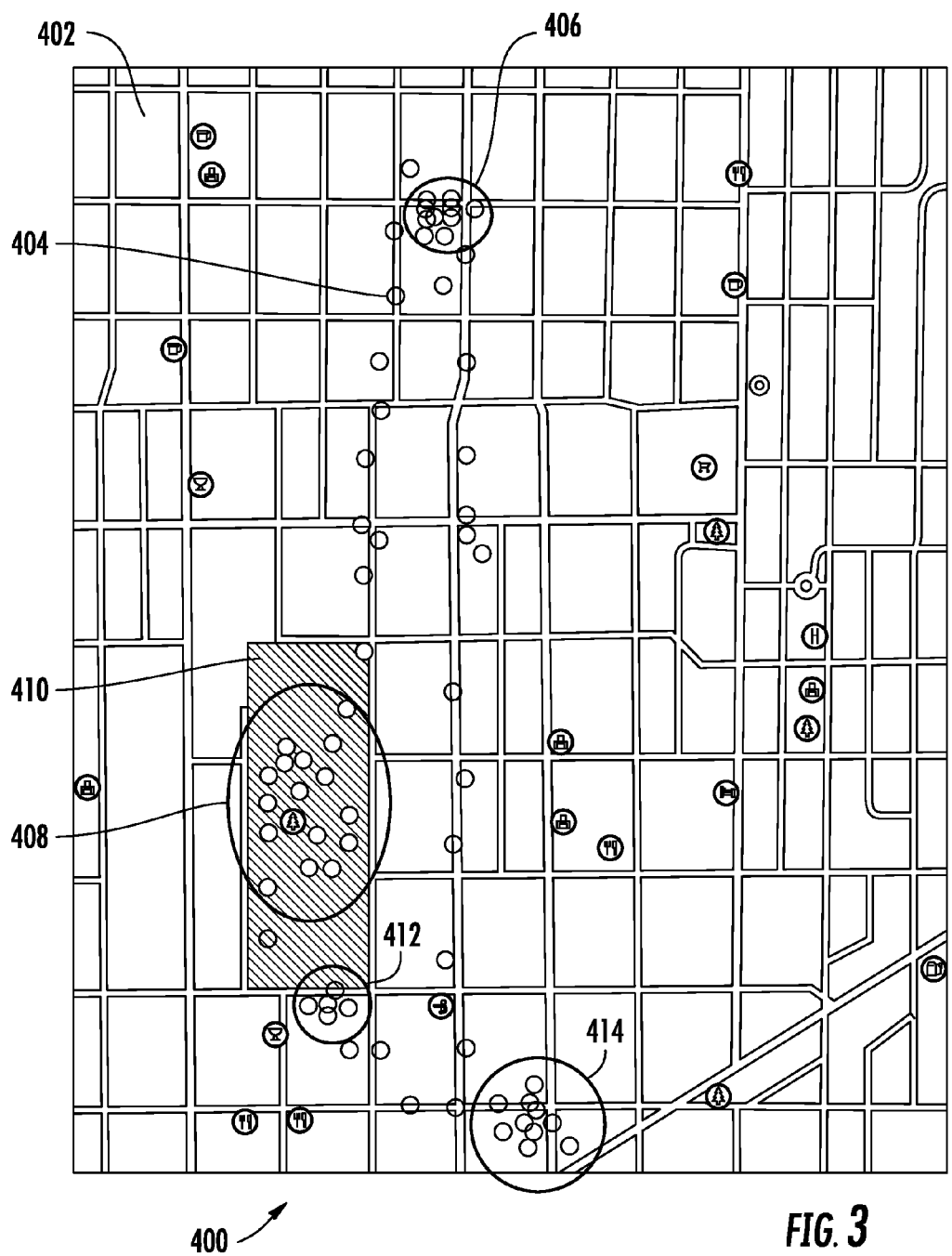
FIG. 3 depicts a graphical representation of estimated device locations from location data reports gathered from a plurality of mobile devices according to example aspects of the present disclosure.

Any number of known location time series segmentation algorithms can be used to implement the partitioning at (204). An example of partitioning (204) is depicted in FIG. 3, which provides an exemplary graphical representation 400 of location data report information gathered from a plurality of mobile devices. In particular, graphical representation 400 depicts a plurality of markers (e.g. marker 404) that respectively correspond to a plurality of locations represented by a plurality of location data reports. Thus, each marker corresponds to the physical location estimate included in a location data report received from a device associated with a user. While FIG. 3 and other figures only indicate a single point location for each location data report, this will be understood to not limit the kinds of information that can be contained in location data reports received by the disclosed embodiments.

Referring still to FIG. 3, the plurality of markers can be segmented into a plurality of localized segments, such as, for example, localized segments 406, 408, 412 and 414. Each segment can include one or more of the plurality of location data reports. As an example, localized segment 408 includes a plurality of location data reports which can be seen from the figure to correspond to the user walking in a park 410. It will be appreciated that partitioning (204) can combine location data reports into a single segment even if not all the location data reports have an identical estimated physical location. The location data reports included in segment 408 may be grouped together by a partitioning or segmentation algorithm based in part on one or more of: the identification of user activity or speed corresponding to standing or walking as opposed to driving for each of the reports, the lack of overall continuous progress from one location toward another, the semantic place database indicating that the estimated physical locations lie within or near a large contiguous semantic place, and/or the semantic place indicating that this place is amenable to walking (such as by being classified as a park).

Referring again to FIG. 2, geolocation algorithms can then be applied to each localized segment partitioned at (204) in order to estimate (206) a geographic region bucket for that segment. A geographic region bucket can correspond to a general geographic identifier, or "rough" location estimate for each segment. In some examples, geographic region buckets can be defined by partitioning a map, grid or other representation of the Earth's surface into a plurality of shapes (e.g., squares, rectangles, circles, polygons or other figures). For example, the geographic confines of a city may be categorized into a rectangular grid of geographic region buckets. Each localized segment is then estimated as associated with one or more of these geographic region buckets. In some examples, this estimation involves determining the median estimated physical location of a user within the time slot of each localized segment and rounding that median location to one or more of the predetermined geographic region buckets. In some instances, a given localized segment for a user or mobile device may be estimated as belonging to more than one geographic region bucket, based at least in part on one or more of: the variation in estimated physical locations in the location data reports, and/or the estimated inaccuracy of physical location estimates in the location data reports. In some examples, the geographic region buckets can be large enough that potential errors in mobile device geolocation algorithms are unlikely to assign a localized segment to the wrong region bucket. The total number and actual size and shape of geographic region buckets can vary among different exemplary embodiments.

Figure 4:
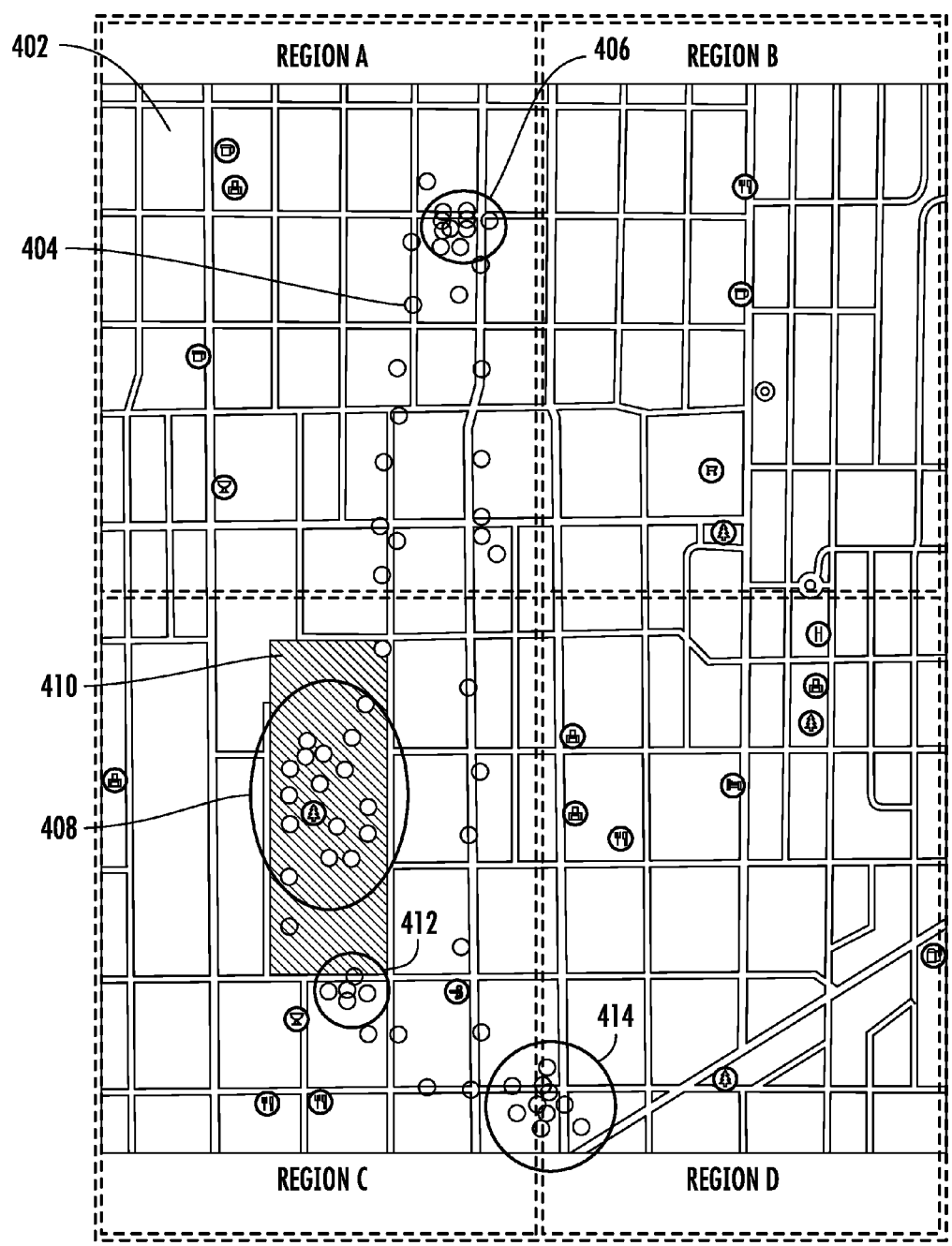
FIG. 4 depicts a graphical representation of estimating geographic region buckets for various localized segments according to example aspects of the present disclosure.

An example of estimating (206) is depicted in FIG. 4, which provides a graphical representation of estimating general geographic regions for various localized segments. Considering the graphical representation 400, the encompassed area is partitioned into four geographic region buckets: Region A, Region B, Region C and Region D. Based on the location information associated with each localized segment and the partitioned grid of four regions established for this non-limiting example, localized segment 406 can be estimated as belonging to Region A, while localized segments 408 and 412 can be estimated as belonging to Region C. Localized segment 414 can be estimated as belonging to two geographic region buckets, namely Region C and Region D. As such, subsequent algorithms applied to Regions C and D would both consider localized segment 414 in their analysis.

Referring again to FIG. 2, subsequent aspects (208), (210), (212) and (214) of method (200) are implemented for each of the geographic region buckets estimated at (206) as containing one or more localized segments. A first aspect concerns identifying (208) within each geographic region bucket, one or more clustering canopies, e.g., groups of localized segments that satisfy a potential geographic overlap characterization. In general, any pair of localized segments that shares at least one clustering canopy identified at (208) is determined to be eligible for subsequent overlap scoring determined at (210). In an example of (208), a clustering canopy is defined for a distinct single beacon identifier, such as a Wi-Fi access point BSSID, observed in the geographic region bucket. In some implementations, such a clustering canopy will contain all localized segments containing at least a threshold number or fraction of the segment's location data reports indicating that the given beacon identifier was observed, or observed above a threshold signal strength, or within a certain estimated distance between the beacon and the mobile device. In another example, a clustering canopy is defined for a set of grid points or other points in the geographic region bucket, and a localized segment belongs to every clustering canopy whose point is within a threshold distance of the estimated physical location of at least some threshold number or fraction of the segment's location data reports.

For all pairs of localized segments identified at (208) as being eligible for overlap scoring, an overlap score is determined at (210). In some examples, overlap scoring can involve the use of a heuristic algorithm to compute a metric that correlates with the likelihood of and/or amount of overlap between the geometric areas covered by the actual movement of mobile devices during each pair of two localized segments identified as eligible for overlap scoring. In some examples, this algorithm involves an aggregate function, such as an average, trimmed average, median, a fixed quantile of a per-report similarity function computed over all of, or a sample of, pairs of location data reports from the two localized segments. The per-report similarity function can be Jaccard distance, cosine distance, Tanimoto distance, or the like. In some examples, overlap scores can be modified after their initial determination at (210) based on whether the pair or group of segments were created by the same device or user, or characterized by a same privacy-oriented lossy device indicator as described above, or created by a pair of users who share demographic and/or psychographic commonalities. This post-determination modification could help reflect a higher likelihood that two nearby segments from the same user or from similar users were received when the device(s)/user(s) visited the same place twice as opposed to visiting two nearby places on the two different occasions.

Figure 5:
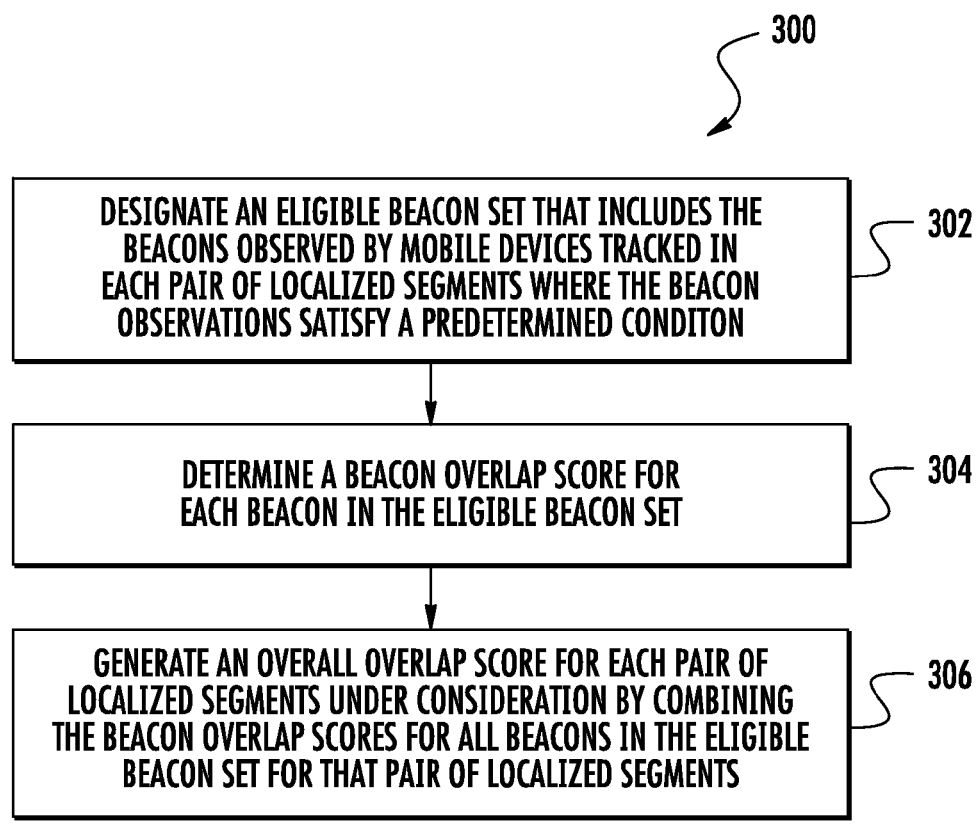
FIG. 5 provides a flow diagram of an example method of determining an overlap score for pairs of localized segments in a geographic region bucket according to example aspects of the present disclosure.

A more particular example of determination (210) is depicted in the method (300) of FIG. 5. The example method (300) of FIG. 5 is presented in the context of having initially received a pair of localized segments each comprised of a time series of sensor beacon observation sets. A sensor beacon observation set can include a list of one or more beacon observations. A beacon observation can include a beacon identifier and a metric correlated with distance from the sensor to the beacon. In one example, each sensor beacon observation set is a Wi-Fi scan; that is, each beacon observation contains a Wi-Fi access point identifier and the RSSI of the respective Wi-Fi access point. Both time series of sensor beacon observation sets are understood to have been collected from the same known geographic region bucket. In such example, method (300) may first involve designating (302) an eligible beacon set that includes the beacons observed by the mobile devices tracked by a pair of localized segments with the observation pattern satisfying a predetermined condition. In one example, the predetermined condition may select as eligible Wi-Fi access point BSSIDs that appear with at least a certain frequency of occurrence and/or signal strength in at least one of the segments, and any such BSSID will be added in (302) as belonging to the eligible beacon set.

Referring still to FIG. 5, a beacon overlap score for each beacon in the eligible beacon set is then determined at (304). The beacon overlap score can indicate a level of overlap between the two localized segments as measured using data about that beacon. In particular, the overlap score correlates inversely with each particular beacon providing stronger evidence that the two intervals do not overlap. In some examples, the overlap score is based on optionally removing outliers from one segment's beacon metric (RSSI) distribution (e.g., by taking the inter-quartile range), and measuring the fraction of the other segment's scans that fall into that range. The same process then can be employed with the segments flipped, thereafter averaging the two determined values. In other examples, instead of averaging the two determined values, other functions may be used to aggregate the two determined values, such as but not limited to the maximum (max), minimum (min), or $\alpha$*max+(1−$\alpha$)*min. In other examples, the beacon overlap score may be generated using other analysis techniques, such as but not limited to a distributional distance metric, such as Earthmover distance, variation distance, Kullback-Leibler divergence, Jaccard similarity, or the like, applied to an optionally kernelized sample distribution, or a statistical goodness-of-fit test applied to a parametric or nonparametric distribution fitted to the empirical distributions.

For a pair of localized segments eligible for overlap scoring, the resulting collection of beacon overlap scores for eligible beacons determined at (304) then can be combined at (306) to generate an overall overlap score for each pair of localized segments under consideration. In some examples, the combining at (306) can be done by repeatedly sampling a random sample of a fixed number or fraction of eligible beacons without replacement, taking the minimum of the k per-beacon scores, and averaging the result across multiple random samples. For eligible beacon lists shorter than k, the overall minimum beacon overlap score can be used. In other examples, the combining at (306) can be done by using a different function, such as but not limited to a maximum, a fixed percentile, or a weighted sum with different weights assigned to different quantiles. In yet other examples, the combining at (306) can be done using optimization over a statistical model which may utilize one or more of: possibly uncertain information about the beacons' location, the per-beacon distribution of metric values, and/or the properties of the mobile device.

Referring again to FIG. 2, the resulting set of overlap metric values represented by overlap scores determined at (210) can be provided as input to a clustering algorithm that generates (212) a data structure which provides a clustering configuration of the localized segments in each geographic region bucket. In some examples, hierarchical clustering is used to generate the data structure at (212). In some examples, a canopy hierarchical agglomerative clustering algorithm is used to generate the data structure at (212). In other examples, hierarchical agglomerative clustering can be replaced by another known clustering technique that uses overlap heuristics to generate clusters that are separated from each other by rarely-crossed divisions of space. In some examples, the data structure generated at (212) is a forest data structure or tree data structure that has leaves corresponding to the individual localized segments. In some examples, the clustering algorithm uses average linking merging or single linkage merging, with an optional defined score threshold for terminating the merging. In other examples, linkage merging clustering may be replaced by a different merging heuristic that more directly compares two clustering forest nodes. In still further examples, a different linkage merging procedure can be employed that uses some or all of the pairwise overlap metric values between pairs of leaves in the subtrees of two candidate forest nodes.

Figure 6:
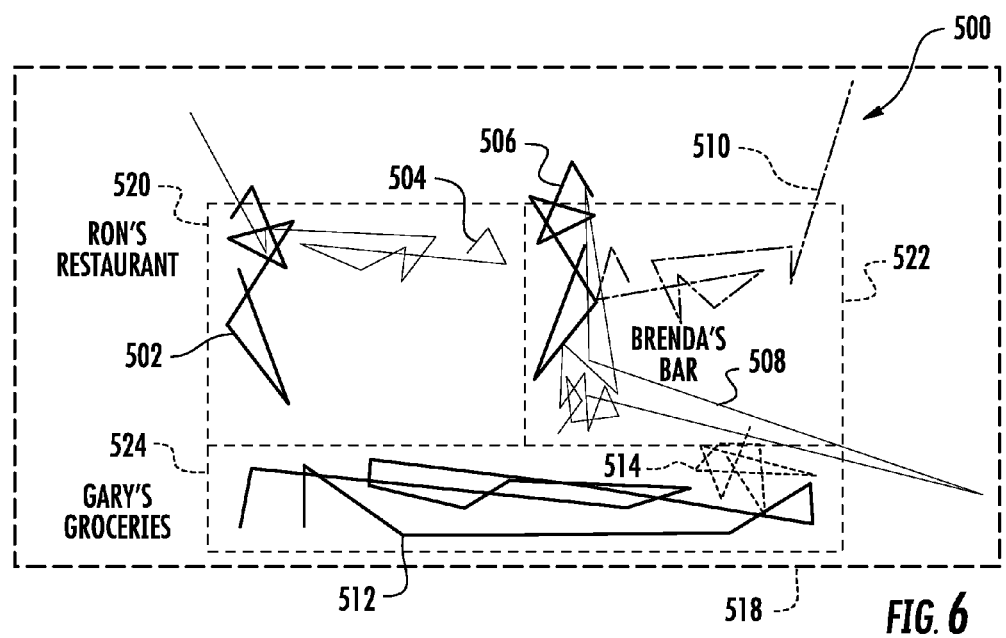
FIG. 6 depicts a graphical representation of a plurality of localized segments within a given geographic region bucket according to example aspects of the present disclosure.
Figure 7:
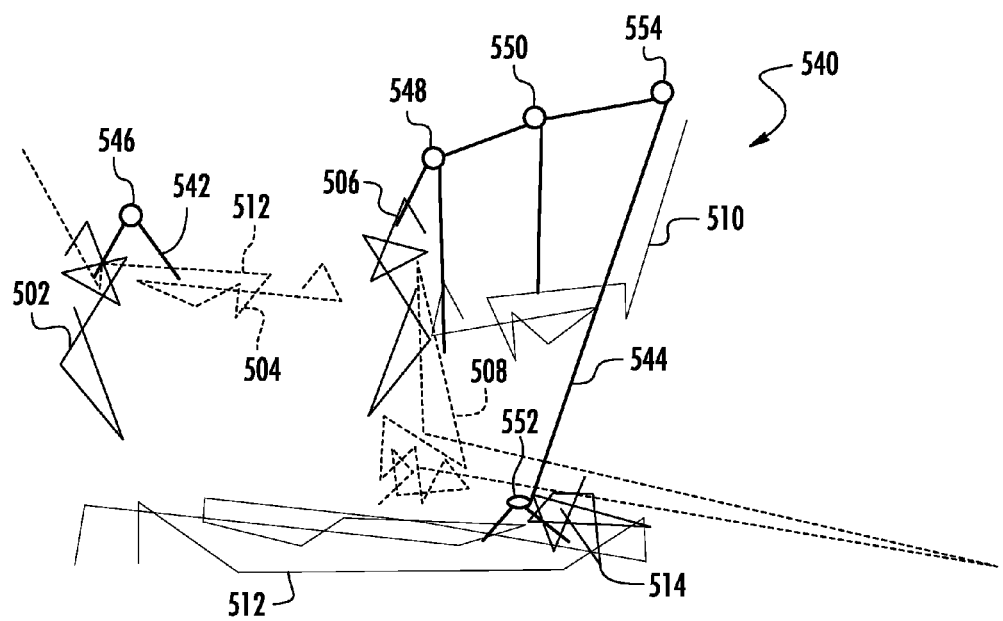
FIG. 7 depicts a graphical representation of an example data structure generated for the collection of localized segments from FIG. 6 according to example aspects of the present disclosure.

Example aspects of generating a data structure (212) are depicted in FIGS. 6 and 7. FIG. 6 provides a graphical representation 500 of a plurality of localized segments 502-514, respectively, that are identified within a given geographic region bucket 518. Each localized segment 502-514 represents a different user track within geographic region bucket 518 during a particular time period. In the real world, the localized segments 502-514 track the various mobile device users as they traverse areas within three different local businesses, namely, Ron's Restaurant 520, Brenda's Bar 522 and Gary's Groceries 524. The dashed lines shown around each business 520/522/524 are, in typical implementations, not known or not completely known to the system. In some examples, the clustering algorithm may receive as input the exact or approximate number of semantic places expected to be found in the geographic region bucket. In other examples, the identity and/or number of businesses that actually exist within geographic region bucket 518 may be unknown.

FIG. 7 provides a graphical representation of an example data structure 540 generated using hierarchical clustering applied to the localized segments from FIG. 6. Example data structure 540 is built as a clustering forest with leaf nodes corresponding to the different localized segments. The overall framework of the data structure 540, including the identification of various segments as leaf and/or non-leaf nodes within the data structure, is determined in part from the overlap scores that are generated for each pair of segments eligible for overlap scoring. The overlap score between a pair of segments generally correlates with the amount of overlap or "entanglement" between the two user tracks that correspond to the two segments. In the specific example of FIGS. 6 and 7, the canopy hierarchical agglomerative clustering algorithm with average linkage merging proceeds as follows. The first "merge" operation joins the leaf nodes of segments 502 and 504 to a new parent node 546. Then, leaf nodes for segments 506 and 508 are merged to form a new parent node 548. Then, node 548 is merged with the leaf node for segment 510 to form a new parent node 550. Then, leaf nodes corresponding to segments 512 and 514 are merged to form a new parent node 552. Then, nodes 550 and 552 are merged to form a new parent node 554. The merge score of nodes 554 and 546 does not meet a merge threshold, and thus the algorithm terminates, leaving 554 and 546 as parent-less "root nodes" of their trees.

The overlap scores generated for each eligible pair of segments in FIGS. 6 and 7 determine the ordering of the merge operations. In other words, they explain why certain nodes are joined to specific nodes and not others. For example, segments 506 and 508 are joined to form node 548 right after 546 was created. Since they are leaf nodes, their merge score is their overlap score: MergeScore(506, 508) =OverlapScore(506,508). Since this operation takes place in lieu of 506 being joined with 546, we know that OverlapScore(506, 508)>OverlapScore(506, 546), the latter being defined by the average linkage merging heuristic: OverlapScore(506, 546)=Average(OverlapScore(506, 502), OverlapScore(506, 504)). Similarly, for example, OverlapScore (506, 508)>OverlapScore(506, 510)—otherwise, 510 would have been merged with 506. OverlapScore(X,Y) for segments X, Y that are not eligible for overlap scoring is defined as zero. It should be appreciated that data structures similar to forest data structure 540 may include many more segments, and nodes configured in a variety of specific formats.

Semantic place data ultimately can be determined at (214) for one or more of the localized segments in each geographic region bucket based on the hierarchical clustering configuration and resultant data structure generated at (212). The semantic place data determined at (214) can take a variety of forms, some of which is represented by the example method (310) of FIG. 8. Method 310 involves such aspects (312), (314) and (316) that can be implemented individually or in select combinations. In some examples, one or more of the data structures generated at (212), the semantic place model(s) generated at (314), or semantic place labels generated by the semantic place model(s) generated at (314) in response to subsequent user queries can be provided as output to a user at (316) in textual, graphic, video, audio or other form.

In one example, determining semantic place data at (214) involves first implementing a pre-processing training subroutine that associates a semantic data label to certain parts of the data structure generated at (212) responsive to receiving at (202) one or more localized segments with semantic data labels. A classifier can then be identified, based at least in part on the clustering configuration from (212), for one or more of the semantic data labels received. An online subroutine then associates semantic data with the received segments, using the classifiers identified by the training subroutine. This example can be useful when semantic data is received for one or only a subset of localized segments in an initial collection of location data reports. That limited information coupled with the clustering associations generated at (212) can ultimately expand the amount of semantic location data available for various groupings of particular localized segments in a useful way.

In one example, the generated data structure can be used to associate (312) a semantic place label to certain localized segments. Typically, but not always, multiple localized segments will be associated with each semantic place label. The semantic place labels can generally correspond to a semantic identifier for a location entity, where location entities refer to any feature, landmark, point of interest (POI), or other object or event associated with a geographic location. For instance, a location entity can include a business, restaurant, church, residence, retail outlet, coffee shop, bar, music venue, attraction, museum, theme park, arena, stadium, festival, organization, region, neighborhood, or other suitable points of interest; or subsets of another location entity; or a combination of multiple contiguous location entities frequently visited in a single visit. The semantic place label is a regionally unique identifier of the location entity, which is distinguishable from a coordinate-based or location-based identifier. However, in addition to a name, the semantic place data associated with a particular location entity by the disclosed embodiments can further include metadata about the location entity, such as its category; partial, uncertain, and/or complete information about the venue's physical location and geometry; and one or more characterizations of distributions of behaviors, demographics, or psychographics of users who visit this location entity.

Sources for identifying semantic place labels for a localized segment can include, for example, a database of entity information that links location entities to geographic locations (e.g. a geographic information system database). Factors for designating the most appropriate semantic place label can include one or more of: a distance feature representing a distance between the location entity and a segment location associated with the localized segment for which the location entity was identified; a popularity feature describing a popularity of the location entity (e.g., a number of social media mentions, a number of check-ins, a number of requests for directions, and/or a global popularity rank); a business hour overlap feature describing whether a set of business hours associated with the location entity overlap with a time segment for the localized segment(s) for which the location entity was identified; and one or more personalization features describing previous interaction between the user from which a localized segment was received and the location entity corresponding to that segment. Example personalization features can include: a number of instances in which the user performed a map click with respect to the location entity; a number of instances in which the user requested directions to the location entity; a number of instances in which the user has checked-in to the location entity; a number of instances in which the user has transacted with the location entity as evidenced by data obtained from a mobile payment system or virtual wallet; and/or a number of instances in which the user has performed a web search query with respect to the location entity.

The disclosed techniques can also be used to provide semantic place labeling and other meaningful correlation of semantic place data to location data reports when there is very little or no high-confidence sensor readings from many semantic places. This is done by using a large unlabeled corpus of raw sensor reading time series to discover "boundaries" that are seldom crossed by users, and optionally supplementing the resulting model of boundaries with a set of semantic place labels that may otherwise be very sparse and/or low confidence.

In an example of semantic place labeling, aspects of the disclosed technology can be combined with semantic place labels for one or more of the segments among the plurality of localized segments identified in (204). Not all of the localized segments will receive a training label, and often multiple segments will be associated with a specific training label. In some examples, a training label is the semantic identifier for a single known semantic place (e.g., a place of business) and receiving this training label indicates that a localized segment was received from a mobile device that is confidently believed to have been physically present at the single known semantic place during the corresponding time interval for that segment. In some examples, a training label may be comprised of a plurality of n possible businesses (B1, B2, . . . Bn), each associated with a numerical weight, where the weight of Bi indicates the estimated likelihood that a device was at Bi during the segment in question. For each distinct training label, the hierarchically clustered data structure can be used to generate a binary classifier for that label so as to optimize a classification quality metric. In one example, each classifier for a semantic place label is a single node of the forest; then, segments associated with a node of the data structure (either as input segments associated with forest leaves, or via the below-described incremental process) are classified with the label associated with the nearest ancestor node, or with "no semantic place label" if there is no ancestor nodes are classifiers. This correlation between data structure nodes and semantic place labels can then be used to help generate semantic place identifiers for future location data reports and/or localized segments.

In further examples of semantic identifiers or training labels associated with localized segments at (312), the labels can be configured to include additional information about a user, such as information about the demographic or psychographic characteristics of a user or records about concrete measurable behaviors associated with the user whose position is indicated by the localized segment. As an example, some localized segments may be observed to come from users who search for luxury consumer product brands. In another example, some localized segments may be observed as coming from users who click on a certain advertisement or category of advertisements. Resulting inferences from a model can then be used to predict user actions, demographics, and/or psychographics using techniques disclosed herein.

In another example, a model can be generated at (314) indicating semantic place data, probabilities for use in predicting previous or current user locations, or for responding to queries. For example, once the data structure generated at (212) is in place, a query including a localized segment or one or more location data reports can be provided as input to an incremental clustering algorithm which provides an output that injects each of the segment inputs separately into the data structure, associating it with an existing node at which the segment would have been merged had it been in the original input of the clustering. In some examples, a query including a new location data report or localized segment will return a specific semantic place label associated with the cluster that the query segment is inserted into. In other examples, one or more semantic place labels can be returned as query output along with probabilities or confidences associated with the location entities within that cluster. In still further examples, a measure of homogeneity for a new segment's neighborhood in the forest model can be generated, for instance, based on what fraction of the nearest N nodes in the forest have at least a threshold level of confidence of being associated with a given semantic place. In still further examples, graphical representations of semantic place boundary estimates such as those depicted by boundary estimates 142 and 144 in FIG. 1 can be generated from the data structure generated at (212).

Still further examples of models generated at (314) do not include aspects of semantic place labeling. In one example, a measure of diversity of user/device identifiers in a given part of the data structure generated at (212) can be generated. For instance, an estimate can be generated that identifies how "public" the surrounding space is, thus helping to make determinations of whether a location entity is a private residence or a public establishment that might be just downstairs or next door. Considering a large corpus of location data reports over a long period of time (e.g., a year), it is more likely that segments tracked to the same subset of users/devices over a long period of time might correspond to a private home or business, while constantly changing users/devices could indicate a more public establishment. Other examples can utilize modeling information that associates known location data reports to specific user criteria to help predict such criteria for future location data reports. For instance, if a set of location data reports and/or localized segments are known to belong to users with a certain demographic or psychographic property, then a model can be used to predict this property about the user generating a future location data report or localized segment.

Figure 9:
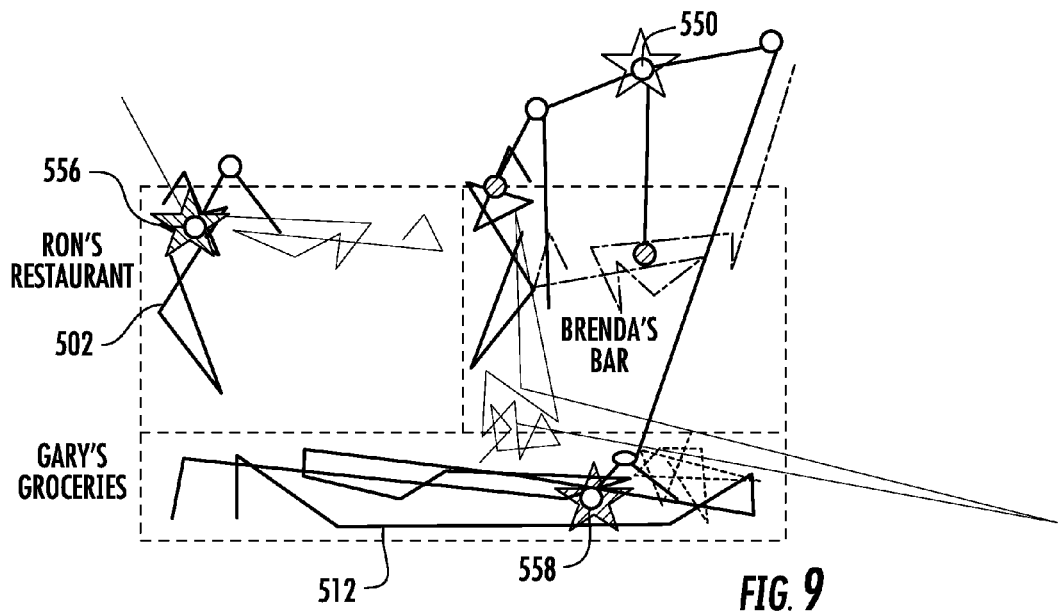
FIG. 9 provides a graphical representation of example semantic place labeling and classifier training in keeping with the examples of FIGS. 6 and 7 according to example aspects of the present disclosure.
Figure 10:
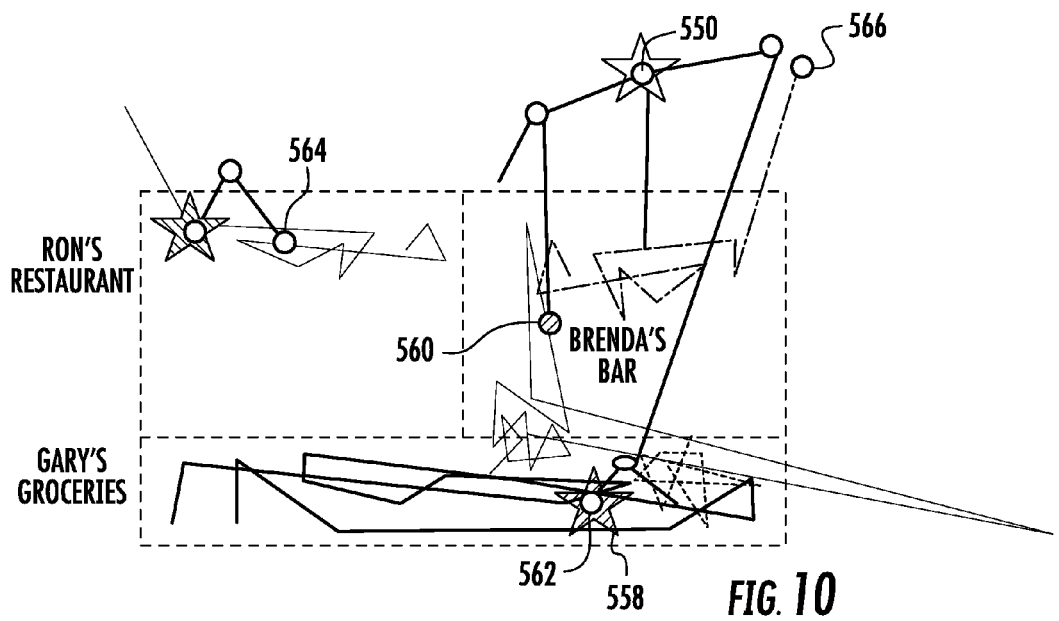
FIG. 10 provides a graphical representation of a query model analysis for new localized segments in keeping with the example of FIGS. 6, 7 and 9 according to example aspects of the present disclosure.

Examples of determining semantic place data (214) are depicted in FIGS. 9 and 10. The examples of FIGS. 9 and 10 build on the example illustrated in and discussed with reference to FIGS. 6 and 7. FIG. 9 illustrates an example of associating (312) a semantic place label to certain localized segments, while FIG. 10 depicts using a model generated at (314) to generate query results for a new segment. Referring more particularly to FIG. 9, the example can include some knowledge about some of the segments 502-514. For example, some of the localized segments 502-514 can have a semantic place associated with them with a relatively high level of confidence. High confidence labels can be the result of a user's confirmation that they are visiting a certain place at a certain time, or the result of a system determination that a user's location is highly likely to correspond to a particular location entity. For instance, consider in the example of FIG. 9 that segment 502 is confidently associated with Ron's Restaurant, segments 506 and 510 are confidently associated with Brenda's Bar, and segment 512 is confidently associated with Gary's Groceries.

Another node labeling feature depicted in FIG. 9 involves classifier training. In classifier training, at least one node in the forest data structure is identified as a classifier node for all or some of the available semantic place labels. These nodes can be chosen to optimize a classifier quality metric score (e.g., F1 score). In other words, a classifier node for a given semantic place label corresponds to the node that maximizes the classifier quality metric score based on the provided set of training semantic labels associated with nodes. Classifier nodes in FIG. 9 are labeled with stars. The leaf node 556 corresponding with segment 502 is the classifier node for Ron's Restaurant, node 550 is selected as the classifier node for Brenda's Bar and leaf node 558 corresponding with segment 512 is the classifier node for Gary's Groceries. These classifier nodes can be used in subsequent system applications to characterize new location data reports and localized segments based on the generated semantic place boundary model.

FIG. 10 depicts an example of how a classifier node model such as that generated in FIG. 9 can be used to analyze a query for a new localized segment. In FIG. 10, assume that four queries, each containing a new localized segment or one or more location data reports are received. Each query can be associated with one or more nodes in the data structure using the techniques described herein. Suppose the received queries are associated with nodes 560-566. In some examples, each query can be labeled based on a model such as generated in FIG. 9, using the label of the nearest ancestor classifier nodes as previously described. In the example of FIG. 10, a segment corresponding to node 560 is thus classified as being at Brenda's Bar since the classifier node 550 for Brenda's bar is its ancestor. Similarly, a segment corresponding to node 562 could receive a classification (and corresponding semantic place label) as being associated with Gary's Groceries because node 562 is labeled as being at Gary's, being identical to the classifier node 558. On the other hand, node 564 has no classifier ancestor, and is thus labeled as "no semantic place" by the model. The segment corresponding to node 566 was not merged into the data structure at all by the incremental clustering, and thus also has no classifier ancestor and thus also receives the "no semantic place" label.

Figure 11:
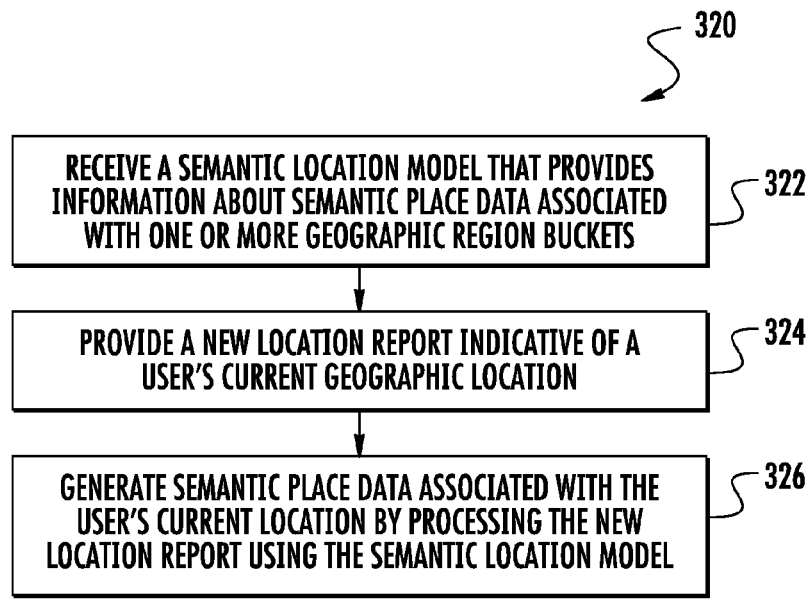
FIG. 11 provides a flow diagram of an example method of determining semantic place data according to example aspects of the present disclosure.

Referring now to FIG. 11, aspects of the disclosed techniques for determining semantic place boundaries and related data as well as the applications resulting from such determinations are discussed in an example method (320). Method (320) is intended to capture aspects of the disclosed technology implemented at an example mobile client device operated by a user or on a server to which the user chooses to upload one or more location data reports. Mobile client device first receives at (322) a semantic location model, such as one or more of the models described above, that provide clustering information about semantic place locations and related data associated with one or more geographic region buckets. In some examples, the semantic location model is generated at least in part from hierarchical clustering algorithms performed on data derived from previous location data reports collected from a plurality of mobile devices operating in the one or more geographic region buckets. One or more new location data reports or a localized segment can then be provided (324) indicating a user's current location or past location. At (326), a prediction of the semantic place associated with the new location data report from (324) then can be generated by processing the new location data report using the semantic location model received at (322). The prediction generated at (326) could include one or more of the query results discussed above relative to the models generated at (314). For instance, predicted data for a new location data report can include a semantic place label, a plurality of possible semantic place labels with corresponding probabilities of a match, information illustrating where the new location data report would fit when inserted into an existing model such as that received at (322), a measure of public/private nature of a place, a measure of homogeneity in the surrounding area, etc.

Figure 12:
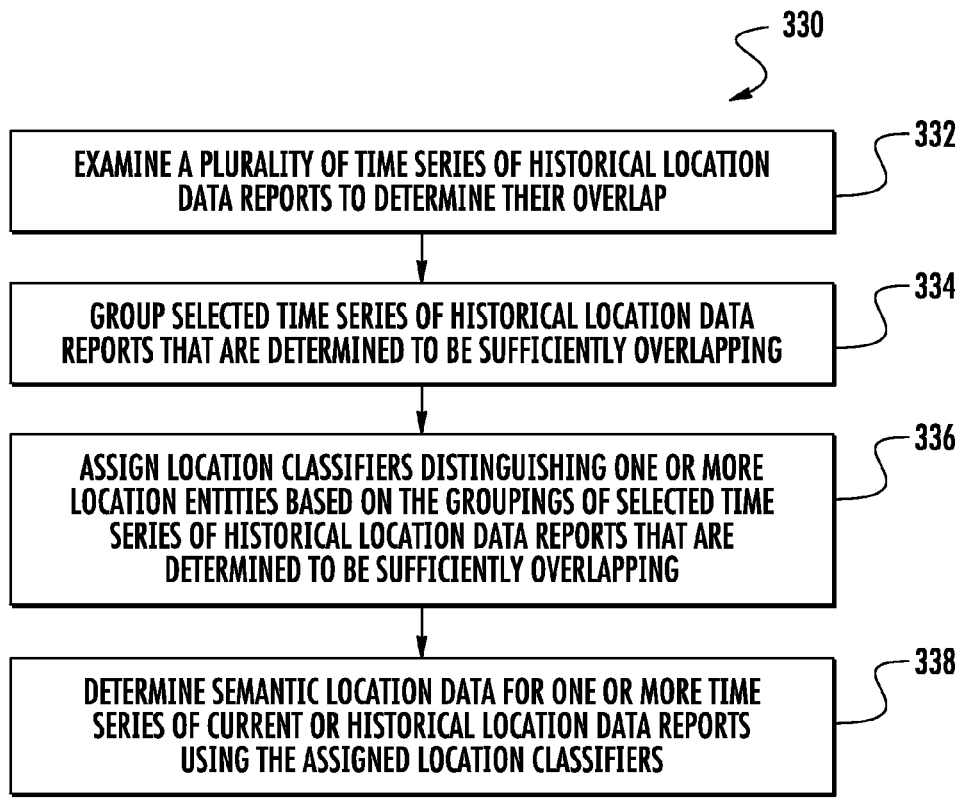
FIG. 12 provides a flow diagram of another example method of determining semantic place data according to example aspects of the present disclosure.

Referring now to FIG. 12, aspects of the disclosed techniques for determining semantic place data as well as the applications resulting from such determinations are discussed in an example method (330). Method (330) is intended to capture another variation of an example for determining semantic place data in accordance with the disclosed technology. A plurality of time series of historical location data reports are examined at (332) in order to determine their relative amount of overlap. The time series of historical location data reports examined at (332) can include any of the variations of location data reports described herein, including but not limited to the routes illustrated in one or more of FIGS. 1, 3 and 4 and/or the location data reports described as being received from a plurality of mobile devices at (202). In some examples, determining a level of overlap at (332) involves determining an overlap score for selected time series of historical location data reports. In some examples, determining a level of overlap at (332) involves determining a metric value of pairwise overlap between selected pairs of time series of historical location data reports. Specific overlap scores or other calculated pairwise similarity metrics used in (332) can be similar to other overlap scores or metrics described herein or other specific scores quantifying a level of overlap between a pair of location data report time series.

Referring still to FIG. 12, selected time series of the historical location data reports that are examined at (332) are grouped together at (334) if they are determined to be sufficiently overlapping. In some examples, groupings of sufficiently overlapping time series of historical location data reports can be implemented using one or more clustering techniques, including but not limited to the various clustering algorithms disclosed herein. Location classifiers can be assigned at (336) that distinguish one or more location entities based on the groupings of selected time series of historical location data reports that are determined at (334) to be sufficiently overlapping. The classifiers can then be used to determine at (338) semantic data for one or more other time series or location data reports. Semantic data can include a variety of information, including but not limited to a semantic place label for a location entity, categories or other metadata associated with a location entity, information about a venue location or geometry associated with a location entity, and one or more characterizations of distributions of behaviors, demographics, or psychographics of users who visit a location entity.

Figure 13:
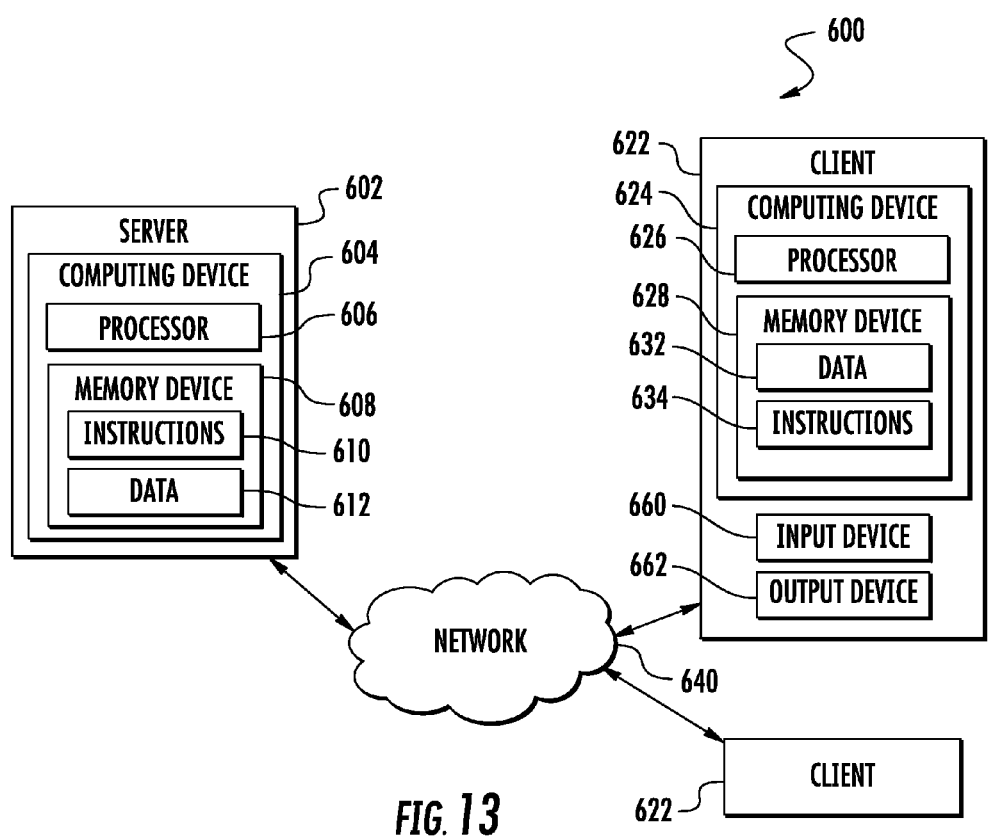
FIG. 13 provides an example overview of system components for implementing a semantic place boundary detection application according to example aspects of the present disclosure.

FIG. 13 depicts a computing system 600 that can be used to implement the methods and systems for determining semantic place boundaries and related data according to example embodiments of the present disclosure. The system 600 can be implemented using a client-server architecture that includes a server 602 and one or more clients 622. Server 602 may correspond, for example, to a web server hosting a geographic information system. Client 622 may correspond, for example, to a personal communication device such as but not limited to a smartphone, navigation system, laptop, mobile device, tablet, wearable computing device or the like.

Figure 8:
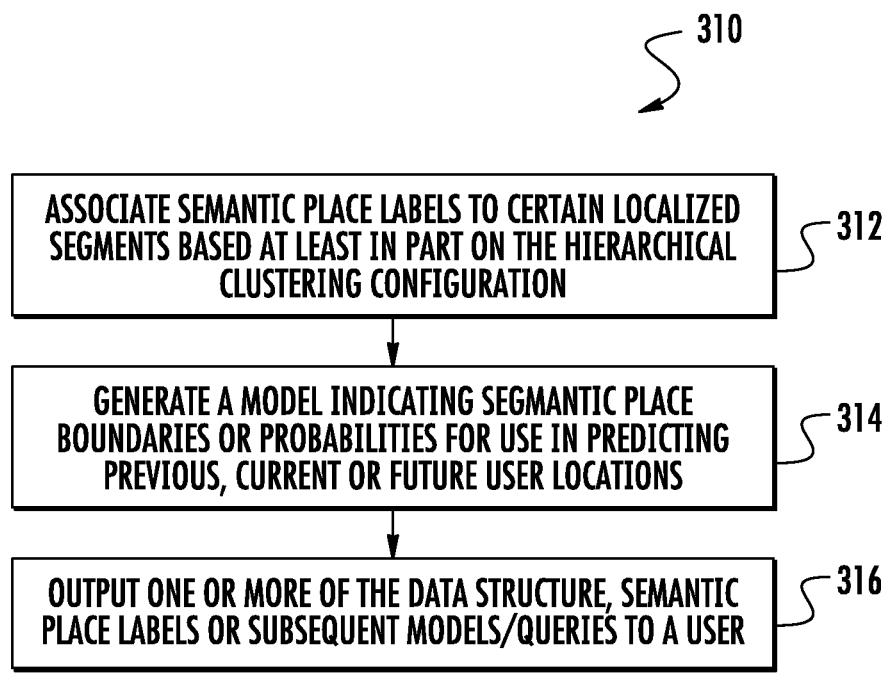
FIG. 8 provides a flow diagram of an example method of determining semantic place data for one or more localized segments in each geographic region bucket based at least in part on clustering analysis.

Each server 602 and client 622 can include at least one computing device, such as depicted by server computing device 604 and client computing device 624. Although only one server computing device 604 and one client computing device 624 is illustrated in FIG. 8, multiple computing devices optionally may be provided at one or more locations for operation in sequence or parallel configurations to implement the disclosed methods and systems of determining semantic place boundaries. In other examples, the system 600 can be implemented using other suitable architectures, such as a single computing device. Each of the computing devices 604, 624 in system 600 can be any suitable type of computing device, such as a general purpose computer, special purpose computer, navigation system (e.g. an automobile navigation system), laptop, desktop, mobile device, smartphone, tablet, wearable computing device, a display with one or more processors, or other suitable computing device.

The computing devices 604 and/or 624 can respectively include one or more processor(s) 606, 626 and one or more memory devices 608, 628. The one or more processor(s) 606, 626 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 608, 628 can include one or more computer-readable media, including, but not limited to, non-transitory computer-readable media, RAM, ROM, hard drives, flash drives, or other memory devices. In some examples, memory devices 608, 628 can correspond to coordinated databases that are split over multiple locations.

The one or more memory devices 608, 628 store information accessible by the one or more processors 606, 626, including instructions that can be executed by the one or more processors 606, 626. For instance, server memory device 608 can store instructions for implementing a semantic place determination algorithm configured to perform various functions disclosed herein. The client memory device 628 can store instructions for implementing a browser or module that allows a user to request information from server 602, including determined semantic place data, labeling, predictions and/or models for past, current or future client locations.

The one or more memory devices 608, 628 can also include data 612, 632 that can be retrieved, manipulated, created, or stored by the one or more processors 606, 626. The data 612 stored at server 602 can include, for instance, the collection of location data reports that are analyzed in method (200), databases of known semantic place identifiers, and the resultant forest/tree data structures and clustering outputs determined in accordance with the disclosed techniques. The data 632 stored at client 622 can include current location data reports and semantic place identifier predictions or probabilities of likelihood.

Computing devices 604 and 624 can communicate with one another over a network 640. In such instances, the server 602 and one or more clients 622 can also respectively include a network interface used to communicate with one another over network 640. The network interface(s) can include any suitable components for interfacing with one more networks, including for example, transmitters, receivers, ports, controllers, antennas, or other suitable components. The network 640 can be any type of communications network, such as a local area network (e.g. intranet), wide area network (e.g. Internet), cellular network, or some combination thereof. The network 640 can also include a direct connection between server computing device 604 and client computing device 624. In general, communication between the server computing device 604 and client computing device 624 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The client 622 can include various input/output devices for providing and receiving information to/from a user. For instance, an input device 660 can include devices such as a touch screen, touch pad, data entry keys, and/or a microphone suitable for voice recognition. Input device 660 can be employed by a user to identify specific location data reports or time series to analyze in accordance with the disclosed embodiments, or to request the display of different models generated in accordance with the disclosed embodiments. An output device 662 can include audio or visual outputs such as speakers or displays for indicating semantic place identifiers or other data and/or place model outputs including semantic place boundary estimates, hierarchical clustering data structures, related maps and the like. Audio and/or visual alarms could also be provided at output device 662 to provide signals to a user indicating the arrival of a user at certain predetermined semantic places (e.g., directions destinations, favorite locations, or others.)

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the module.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining semantic place data, the method comprising:
    receiving, by a computing system and from a plurality of different mobile computing devices, a plurality of location sensor time series;
    partitioning, by the computing system, the plurality of location sensor time series into a plurality of localized segments, each localized segment of the plurality of localized segments corresponding to a time when a mobile device of the plurality of different mobile devices stayed within a given localized area;
    characterizing, by the computing system, each localized segment of the plurality of localized segments as belonging to one or more geographic region buckets of a plurality of different geographic region buckets;
    identifying, by the computing system, a plurality of clustering canopies, wherein identifying the plurality of clustering canopies comprises identifying, for each geographic region bucket of the plurality of different geographic region buckets, one or more clustering canopies;
    determining, by the computing system, a set of overlap scores, wherein determining the set of overlap scores comprises determining, for each group of localized segments of the plurality of localized segments that shares at least one clustering canopy of the plurality of clustering canopies an overlap score that correlates with an overlap among geographic regions covered by movement of one or more mobile computing devices of the plurality of different mobile computing devices associated with one or more localized segments of the plurality of localized segments in the group;
    generating, by the computing system and based on the set of overlap scores, a data structure that provides a hierarchical clustering of one or more localized segments of the plurality of localized segments in each geographic region bucket of the plurality of different geographic region buckets; and
    determining, by the computing system and based on the data structure, semantic place data for one or more localized segments of the plurality of localized segments.

2. The computer-implemented method of claim 1, wherein the semantic place data comprises one or more of a semantic place label for a location entity, categories or other metadata associated with a location entity, information about a venue location or geometry associated with a location entity, and one or more characterizations of distributions of behaviors, demographics, or psychographies of users who visit a location entity.

3. The computer-implemented method of claim 1, wherein the characterizing comprises:
    determining a median estimated physical location of a user within a time slot of the localized segment; and
    rounding the median estimated physical location to the one or more geographic region buckets.

4. The computer-implemented method of claim 1, wherein each clustering canopy of the plurality of clustering canopies comprises a group of localized segments of the plurality of localized segments in a geographic region bucket of the plurality of different geographic region buckets that satisfy a potential geographic overlap characterization.

5. The computer-implemented method of claim 4, wherein the potential geographic overlap characterization comprises the group of localized segments comprising data indicating that a given beacon identifier was observed.

6. The computer-implemented method of claim 1, wherein the data structure comprises a forest data structure comprising leaves that correspond to the plurality of localized segments.

7. The computer-implemented method of claim 1, wherein generating the data structure comprises utilizing a hierarchical agglomerative clustering algorithm to generate the data structure.

8. The computer-implemented method of claim 1, the method comprising, responsive to receiving, from a mobile computing device, a query comprising a location data report, predicting, based on the data structure, semantic place data for the mobile computing device.

9. A system for determining semantic place data, the system comprising:
    one or more processors; and
    a memory storing instructions that when executed by the one or more processors cause the system to perform operations, the operations comprising:
        receiving, from a plurality of different mobile computing devices, a plurality of location sensor time series;
        partitioning the plurality of location sensor time series into a plurality of localized segments, each localized segment of the plurality of localized segments corresponding to a time when a mobile device of the plurality of different mobile devices stayed within a given localized area;
        characterizing each localized segment of the plurality of localized segments as belonging to one or more geographic region buckets of a plurality of different geographic region buckets;
        identifying a plurality of clustering canopies, wherein identifying the plurality of clustering canopies comprises identifying, for each geographic region bucket of the plurality of different geographic region buckets, one or more clustering canopies;

determining a set of overlap scores, wherein determining the set of overlap scores comprises determining, for each group of localized segments of the plurality of localized segments that shares at least one clustering canopy of the plurality of clustering canopies an overlap score that correlates with an overlap among geographic regions covered by movement of one or more mobile computing devices of the plurality of different mobile computing devices associated with one or more localized segments of the plurality of localized segments in the group;

generating, based on the set of overlap scores, a data structure that provides a hierarchical clustering of one or more localized segments of the plurality of localized segments in each geographic region bucket of the plurality of different geographic region buckets; and determining, based on the data structure, semantic place data for one or more localized segments of the plurality of localized segments.

10. The system of claim 9, wherein the semantic place data comprises one or more of a semantic place label for a location entity, categories or other metadata associated with a location entity, information about a venue location or geometry associated with a location entity, and one or more characterizations of distributions of behaviors, demographics, or psychographics of users who visit a location entity.

11. The system of claim 9, wherein the characterizing comprises:
determining a median estimated physical location of a user within a time slot of the localized segment; and
rounding the median estimated physical location to the one or more geographic region buckets.

12. The system of claim 9, wherein each clustering canopy of the plurality of clustering canopies comprises a group of localized segments of the plurality of localized segments in a geographic region bucket of the plurality of different geographic region buckets that satisfy a potential geographic overlap characterization.

13. The system of claim 12, wherein the potential geographic overlap characterization comprises the group of localized segments comprising data indicating that a given beacon identifier was observed.

14. The system of claim 9, wherein the data structure comprises a forest data structure comprising leaves that correspond to the plurality of localized segments.

15. The system of claim 9, wherein generating the data structure comprises utilizing a hierarchical agglomerative clustering algorithm to generate the data structure.

16. The system of claim 9, the operations comprising, responsive to receiving, from a mobile computing device, a query comprising a location data report, predicting, based on the data structure, semantic place data for the mobile computing device.

17. One or more non-transitory computer-readable media comprising instructions that when executed by a computing system cause the computing system to perform operations, the operations comprising:
receiving, from a plurality of different mobile computing devices, a plurality of location sensor time series;
partitioning the plurality of location sensor time series into a plurality of localized segments, each localized segment of the plurality of localized segments corresponding to a time when a mobile device of the plurality of different mobile devices stayed within a given localized area;

characterizing each localized segment of the plurality of localized segments as belonging to one or more geographic region buckets of a plurality of different geographic region buckets;

identifying a plurality of clustering canopies, wherein identifying the plurality of clustering canopies comprises identifying, for each geographic region bucket of the plurality of different geographic region buckets, one or more clustering canopies;

determining a set of overlap scores, wherein determining the set of overlap scores comprises determining, for each group of localized segments of the plurality of localized segments that shares at least one clustering canopy of the plurality of clustering canopies an overlap score that correlates with an overlap among geographic regions covered by movement of one or more mobile computing devices of the plurality of different mobile computing devices associated with one or more localized segments of the plurality of localized segments in the group;

generating, based on the set of overlap scores, a data structure that provides a hierarchical clustering of one or more localized segments of the plurality of localized segments in each geographic region bucket of the plurality of different geographic region buckets; and determining, based on the data structure, semantic place data for one or more localized segments of the plurality of localized segments.

18. The one or more non-transitory computer-readable media of claim 17, wherein the characterizing comprises:
determining a median estimated physical location of a user within a time slot of the localized segment; and
rounding the median estimated physical location to the one or more geographic region buckets.

19. The one or more non-transitory computer-readable media of claim 17, wherein each clustering canopy of the plurality of clustering canopies comprises a group of localized segments of the plurality of localized segments in a geographic region bucket of the plurality of different geographic region buckets that satisfy a potential geographic overlap characterization.

20. The one or more non-transitory computer-readable media of claim 19, wherein the potential geographic overlap characterization comprises the group of localized segments comprising data indicating that a given beacon identifier was observed.

21. The one or more non-transitory computer-readable media of claim 17, wherein the data structure comprises a forest data structure comprising leaves that correspond to the plurality of localized segments.

22. The one or more non-transitory computer-readable media of claim 17, wherein generating the data structure comprises utilizing a hierarchical agglomerative clustering algorithm to generate the data structure.

23. The one or more non-transitory computer-readable media of claim 17, the operations comprising, responsive to receiving, from a mobile computing device, a query comprising a location data report, predicting, based on the data structure, semantic place data for the mobile computing device.

* * * * *